United States Patent
Bernard et al.

(10) Patent No.: US 9,460,471 B2
(45) Date of Patent: Oct. 4, 2016

(54) SYSTEM AND METHOD FOR AN AUTOMATED VALIDATION SYSTEM

(75) Inventors: Daniel R. Bernard, West Hartford, CT (US); Charles M. Brandi, Burlington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 12/968,773

(22) Filed: Dec. 15, 2010

(65) Prior Publication Data

US 2012/0016695 A1   Jan. 19, 2012

Related U.S. Application Data

(60) Provisional application No. 61/365,180, filed on Jul. 16, 2010.

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
None
See application file for complete search history.

(56) References Cited

U.S. PATENT DOCUMENTS

| | | | |
|---|---|---|---|
| 3,842,348 A * | 10/1974 | Goshy | 324/94 |
| 4,667,336 A | 5/1987 | Best et al. | |
| 4,975,840 A | 12/1990 | DeTore et al. | |
| 5,117,358 A * | 5/1992 | Winkler | 708/135 |
| 5,613,072 A | 3/1997 | Hammond et al. | |
| 5,635,693 A | 6/1997 | Benson et al. | |
| 5,664,109 A | 9/1997 | Johnson et al. | |
| 5,680,329 A | 10/1997 | Lloyd et al. | |
| 5,712,984 A | 1/1998 | Hammond et al. | |
| 5,794,216 A | 8/1998 | Brown | |
| 5,796,932 A | 8/1998 | Fox et al. | |
| 5,797,134 A | 8/1998 | McMillan et al. | |
| 5,825,283 A | 10/1998 | Camhi | |
| 5,842,148 A | 11/1998 | Prendergast et al. | |
| 5,873,066 A | 2/1999 | Underwood et al. | |
| 5,926,800 A | 7/1999 | Baronowski et al. | |

(Continued)

FOREIGN PATENT DOCUMENTS

| | | |
|---|---|---|
| EP | 0155779 | 9/1985 |
| EP | 1145163 | 10/2001 |

(Continued)

OTHER PUBLICATIONS

Explaining oAuth, Hammer, E. 2007.*

(Continued)

*Primary Examiner* — Robert R Niquette
*Assistant Examiner* — Joseph W King
(74) *Attorney, Agent, or Firm* — Howard IP Law Group, PC

(57) ABSTRACT

An automated validation system validates whether a property of a policyholder receiving at least one insurance benefit is currently receiving remote monitoring services, as represented by the policyholder. The system includes an application server, a trusted third party server, and a business logic computer. The application server requests the trusted third party server to validate whether the property of the policyholder is presently receiving remote monitoring services from a service provider. A business logic computer can adjust the policyholder's insurance policy based on the received validation results.

30 Claims, 6 Drawing Sheets

(56) References Cited

U.S. PATENT DOCUMENTS

| | | |
|---|---|---|
| 5,950,150 A | 9/1999 | Lloyd et al. |
| 5,970,464 A | 10/1999 | Apte et al. |
| 5,991,733 A | 11/1999 | Aleia |
| 6,014,632 A | 1/2000 | Gamble et al. |
| 6,064,970 A | 5/2000 | McMillan et al. |
| 6,067,488 A | 5/2000 | Tano |
| 6,078,857 A | 6/2000 | Jung et al. |
| 6,112,225 A | 8/2000 | Kraft et al. |
| 6,154,658 A | 11/2000 | Caci |
| 6,163,277 A | 12/2000 | Gehlot |
| 6,163,770 A | 12/2000 | Gamble et al. |
| 6,182,048 B1 | 1/2001 | Osborn et al. |
| 6,204,757 B1 | 3/2001 | Evans et al. |
| 6,211,777 B1 | 4/2001 | Greenwood et al. |
| 6,223,125 B1 | 4/2001 | Hall |
| 6,246,934 B1 | 6/2001 | Otake et al. |
| 6,307,965 B1 | 10/2001 | Aggarwal et al. |
| 6,317,718 B1 | 11/2001 | Fano |
| 6,389,340 B1 | 5/2002 | Rayner |
| 6,463,437 B1* | 10/2002 | Mongilio |
| 6,502,020 B2 | 12/2002 | Lang |
| 6,563,423 B2 | 5/2003 | Smith |
| 6,583,734 B2 | 6/2003 | Bates et al. |
| 6,594,579 B1 | 7/2003 | Lowrey et al. |
| 6,611,740 B2 | 8/2003 | Lowrey et al. |
| 6,633,820 B2 | 10/2003 | Bizar |
| 6,636,150 B2* | 10/2003 | Williams .................. 340/506 |
| 6,636,790 B1 | 10/2003 | Lightner et al. |
| 6,643,578 B2 | 11/2003 | Levine |
| 6,684,189 B1 | 1/2004 | Ryan et al. |
| 6,710,738 B2 | 3/2004 | Allen, Jr. |
| 6,732,031 B1 | 5/2004 | Lowrey et al. |
| 6,735,525 B1 | 5/2004 | Murphy |
| 6,754,485 B1 | 6/2004 | Obradovich et al. |
| 6,756,915 B2 | 6/2004 | Choi |
| 6,767,330 B2 | 7/2004 | Lavery et al. |
| 6,768,417 B2 | 7/2004 | Kuragaki et al. |
| 6,795,759 B2 | 9/2004 | Doyle |
| 6,823,258 B2 | 11/2004 | Ukai et al. |
| 6,832,141 B2 | 12/2004 | Skeen et al. |
| 6,839,305 B2 | 1/2005 | Perlman et al. |
| 6,853,956 B2 | 2/2005 | Ballard, Jr. et al. |
| 6,868,339 B2 | 3/2005 | Murphy et al. |
| 6,868,386 B1 | 3/2005 | Henderson et al. |
| 6,871,199 B1 | 3/2005 | Binnig et al. |
| 6,917,952 B1 | 7/2005 | Dailey et al. |
| 6,920,379 B2 | 7/2005 | Miyamoto |
| 6,925,425 B2 | 8/2005 | Remboski et al. |
| 6,931,309 B2 | 8/2005 | Phelan et al. |
| 6,950,013 B2 | 9/2005 | Scaman et al. |
| 6,957,133 B1 | 10/2005 | Hunt et al. |
| 6,965,326 B2 | 11/2005 | Allison |
| 6,968,453 B2 | 11/2005 | Doyle et al. |
| 6,973,319 B2 | 12/2005 | Ormson |
| 6,974,414 B2 | 12/2005 | Victor |
| 6,977,612 B1 | 12/2005 | Bennett |
| 6,985,922 B1 | 1/2006 | Bashen et al. |
| 6,987,964 B2 | 1/2006 | Obradovich et al. |
| 7,017,142 B1 | 3/2006 | Ehnebuske et al. |
| 7,039,592 B1 | 5/2006 | Yegge et al. |
| 7,069,118 B2 | 6/2006 | Coletrane et al. |
| 7,072,841 B1 | 7/2006 | Pednault |
| 7,107,285 B2 | 9/2006 | von Kaenel et al. |
| 7,114,376 B2 | 10/2006 | Loucks et al. |
| 7,215,255 B2 | 5/2007 | Grush |
| 7,264,590 B2* | 9/2007 | Casey et al. .................. 600/300 |
| 7,363,308 B2 | 4/2008 | Dillon et al. |
| 7,389,178 B2 | 6/2008 | Raz et al. |
| 7,561,054 B2 | 7/2009 | Raz et al. |
| 8,214,692 B1* | 7/2012 | Spalink et al. ................ 714/32 |
| 8,326,958 B1* | 12/2012 | Raleigh ........................ 709/223 |
| 2001/0039509 A1 | 11/2001 | Dar et al. |
| 2001/0042024 A1 | 11/2001 | Rogers |
| 2001/0044733 A1 | 11/2001 | Lee et al. |
| 2002/0002475 A1 | 1/2002 | Freedman et al. |
| 2002/0010601 A1 | 1/2002 | Taylor |
| 2002/0013717 A1 | 1/2002 | Ando et al. |
| 2002/0052765 A1 | 5/2002 | Taylor |
| 2002/0055861 A1 | 5/2002 | King et al. |
| 2002/0055903 A1 | 5/2002 | Solomon |
| 2002/0072958 A1 | 6/2002 | Yuyama et al. |
| 2002/0087364 A1 | 7/2002 | Lerner et al. |
| 2002/0091550 A1 | 7/2002 | White et al. |
| 2002/0099596 A1 | 7/2002 | Geraghty |
| 2002/0103622 A1 | 8/2002 | Burge |
| 2002/0111725 A1 | 8/2002 | Burge |
| 2002/0115423 A1 | 8/2002 | Hatae et al. |
| 2002/0116228 A1 | 8/2002 | Bauer et al. |
| 2002/0128882 A1 | 9/2002 | Nakagawa et al. |
| 2002/0145666 A1 | 10/2002 | Scaman et al. |
| 2002/0147617 A1 | 10/2002 | Schoenbaum et al. |
| 2002/0161609 A1 | 10/2002 | Zizzamia et al. |
| 2002/0165739 A1 | 11/2002 | Guyan et al. |
| 2002/0173885 A1 | 11/2002 | Lowrey et al. |
| 2002/0178033 A1 | 11/2002 | Yoshioka et al. |
| 2002/0194033 A1 | 12/2002 | Huff |
| 2002/0194113 A1 | 12/2002 | Lof et al. |
| 2002/0198801 A1 | 12/2002 | Dixon et al. |
| 2003/0009357 A1 | 1/2003 | Pish |
| 2003/0023462 A1* | 1/2003 | Heilizer ........................ 705/4 |
| 2003/0028406 A1 | 2/2003 | Herz et al. |
| 2003/0033057 A1 | 2/2003 | Kallestad |
| 2003/0040934 A1 | 2/2003 | Skidmore et al. |
| 2003/0061075 A1 | 3/2003 | Heckman et al. |
| 2003/0088562 A1 | 5/2003 | Dillon et al. |
| 2003/0093366 A1 | 5/2003 | Halper et al. |
| 2003/0101080 A1 | 5/2003 | Zizzamia et al. |
| 2003/0105651 A1 | 6/2003 | Gendelman |
| 2003/0135395 A1 | 7/2003 | Carfi et al. |
| 2003/0139948 A1 | 7/2003 | Strech |
| 2003/0154009 A1 | 8/2003 | Basir et al. |
| 2003/0158758 A1 | 8/2003 | Kanazawa et al. |
| 2003/0171956 A1 | 9/2003 | Cox et al. |
| 2003/0187702 A1 | 10/2003 | Bonissone et al. |
| 2003/0187704 A1 | 10/2003 | Hashiguchi et al. |
| 2003/0221118 A1 | 11/2003 | Walker |
| 2003/0229522 A1 | 12/2003 | Thompson et al. |
| 2003/0233261 A1 | 12/2003 | Kawahara et al. |
| 2003/0233278 A1 | 12/2003 | Marshall |
| 2003/0233323 A1 | 12/2003 | Bilski et al. |
| 2004/0036601 A1 | 2/2004 | Obradovich |
| 2004/0039586 A1 | 2/2004 | Garvey et al. |
| 2004/0039611 A1 | 2/2004 | Hong et al. |
| 2004/0059688 A1* | 3/2004 | Dominguez et al. ........... 705/75 |
| 2004/0103002 A1 | 5/2004 | Colley et al. |
| 2004/0117217 A1 | 6/2004 | Reber et al. |
| 2004/0138927 A1 | 7/2004 | Eydeland et al. |
| 2004/0139034 A1 | 7/2004 | Farmer |
| 2004/0148201 A1 | 7/2004 | Smith et al. |
| 2004/0153362 A1 | 8/2004 | Bauer et al. |
| 2004/0153762 A1 | 8/2004 | Flynn et al. |
| 2004/0181495 A1 | 9/2004 | Grush |
| 2004/0186753 A1 | 9/2004 | Kim et al. |
| 2004/0199410 A1 | 10/2004 | Feyen et al. |
| 2004/0215494 A1 | 10/2004 | Wahlbin et al. |
| 2004/0220784 A1 | 11/2004 | Stephenson et al. |
| 2004/0220837 A1 | 11/2004 | Bonissone et al. |
| 2004/0220838 A1 | 11/2004 | Bonissone et al. |
| 2004/0220839 A1 | 11/2004 | Bonissone et al. |
| 2004/0220840 A1 | 11/2004 | Bonissone et al. |
| 2004/0225535 A1 | 11/2004 | Bond et al. |
| 2004/0236596 A1 | 11/2004 | Chowdhary et al. |
| 2004/0236611 A1 | 11/2004 | Bonissone et al. |
| 2004/0236676 A1 | 11/2004 | Takezawa et al. |
| 2004/0243450 A1 | 12/2004 | Bernard et al. |
| 2004/0249557 A1 | 12/2004 | Harrington et al. |
| 2004/0249679 A1 | 12/2004 | Henderson et al. |
| 2004/0259524 A1* | 12/2004 | Watkins et al. ................ 455/405 |
| 2004/0260578 A1* | 12/2004 | Jin .................................. 705/4 |
| 2004/0260579 A1 | 12/2004 | Tremiti |
| 2004/0267577 A1 | 12/2004 | Nakai |
| 2005/0021360 A1 | 1/2005 | Miller et al. |
| 2005/0038682 A1 | 2/2005 | Gandee et al. |
| 2005/0055248 A1 | 3/2005 | Helitzer et al. |

(56) References Cited

U.S. PATENT DOCUMENTS

| | | |
|---|---|---|
| 2005/0055249 A1 | 3/2005 | Helitzer et al. |
| 2005/0060141 A1 | 3/2005 | Suzuki et al. |
| 2005/0060207 A1 | 3/2005 | Weidner et al. |
| 2005/0065682 A1 | 3/2005 | Kapadia et al. |
| 2005/0070299 A1 | 3/2005 | Caspi et al. |
| 2005/0071202 A1 | 3/2005 | Kendrick |
| 2005/0075067 A1 | 4/2005 | Lawson et al. |
| 2005/0086084 A1 | 4/2005 | Dillard |
| 2005/0091085 A1 | 4/2005 | Colley et al. |
| 2005/0091175 A9 | 4/2005 | Farmer |
| 2005/0102172 A1 | 5/2005 | Sirmans |
| 2005/0108063 A1 | 5/2005 | Madill et al. |
| 2005/0108065 A1 | 5/2005 | Dorfstatter |
| 2005/0108066 A1 | 5/2005 | Weidner et al. |
| 2005/0125259 A1 | 6/2005 | Annappindi |
| 2005/0131742 A1 | 6/2005 | Hoffman et al. |
| 2005/0137912 A1 | 6/2005 | Rao et al. |
| 2005/0171885 A1 | 8/2005 | Christman et al. |
| 2005/0174217 A1 | 8/2005 | Basir et al. |
| 2005/0192730 A1 | 9/2005 | Churchill et al. |
| 2005/0216583 A1 | 9/2005 | Cole et al. |
| 2005/0222867 A1 | 10/2005 | Underwood et al. |
| 2005/0228692 A1 | 10/2005 | Hodgdon |
| 2005/0234742 A1 | 10/2005 | Hodgdon |
| 2005/0240451 A1 | 10/2005 | Johnson et al. |
| 2005/0250440 A1* | 11/2005 | Zhou et al. ............. 455/12.1 |
| 2005/0276401 A1 | 12/2005 | Madill et al. |
| 2005/0278082 A1 | 12/2005 | Weekes |
| 2005/0285748 A1 | 12/2005 | Pedraza et al. |
| 2006/0000420 A1 | 1/2006 | Martin Davies |
| 2006/0009289 A1 | 1/2006 | McCarten et al. |
| 2006/0015253 A1 | 1/2006 | Ochs et al. |
| 2006/0015360 A1 | 1/2006 | Ochs et al. |
| 2006/0015373 A1 | 1/2006 | Cuypers |
| 2006/0015374 A1 | 1/2006 | Ochs et al. |
| 2006/0033625 A1 | 2/2006 | Johnson et al. |
| 2006/0036473 A1 | 2/2006 | Taylor |
| 2006/0053038 A1 | 3/2006 | Warren et al. |
| 2006/0064332 A1 | 3/2006 | Schoenbaum et al. |
| 2006/0136273 A1 | 6/2006 | Zizzamia et al. |
| 2006/0165040 A1 | 7/2006 | Rathod et al. |
| 2006/0187889 A1 | 8/2006 | Mehta et al. |
| 2006/0232398 A1 | 10/2006 | Nedblake et al. |
| 2006/0242046 A1 | 10/2006 | Haggerty et al. |
| 2006/0244589 A1* | 11/2006 | Schranz ............. 340/539.22 |
| 2006/0259333 A1 | 11/2006 | Pyburn |
| 2006/0287892 A1 | 12/2006 | Jones et al. |
| 2007/0005373 A1* | 1/2007 | Villena et al. ............. 705/1 |
| 2007/0005404 A1 | 1/2007 | Raz et al. |
| 2007/0016500 A1 | 1/2007 | Chatterji et al. |
| 2007/0016508 A1 | 1/2007 | Lapointe et al. |
| 2007/0021987 A1 | 1/2007 | Binns et al. |
| 2007/0027725 A1 | 2/2007 | Dirnberger et al. |
| 2007/0027726 A1 | 2/2007 | Warren et al. |
| 2007/0043656 A1 | 2/2007 | Lancaster |
| 2007/0043662 A1 | 2/2007 | Lancaster |
| 2007/0073748 A1 | 3/2007 | Barney |
| 2007/0106539 A1 | 5/2007 | Gay |
| 2007/0174082 A1 | 7/2007 | Singh |
| 2007/0209271 A1* | 9/2007 | Mediate ............. 43/132.1 |
| 2007/0276700 A1* | 11/2007 | Daigle et al. ............. 705/3 |
| 2008/0065427 A1* | 3/2008 | Helitzer et al. ............. 705/4 |
| 2008/0235176 A1* | 9/2008 | Kirovski ............. 707/1 |
| 2009/0006023 A1* | 1/2009 | Tiegs ............. 702/122 |
| 2009/0037230 A1 | 2/2009 | Tracy et al. |
| 2009/0210259 A1* | 8/2009 | Cardot et al. ............. 705/4 |
| 2009/0265229 A1* | 10/2009 | Sidhu ............. 705/14 |
| 2009/0271842 A1* | 10/2009 | Baumhof ............. 726/1 |
| 2010/0017234 A1* | 1/2010 | Stephens et al. ............. 705/4 |
| 2010/0039512 A1* | 2/2010 | Kurz ............. 348/143 |
| 2010/0147510 A1* | 6/2010 | Kwok et al. ............. 166/250.01 |
| 2011/0141277 A1* | 6/2011 | Midkiff ............. 348/143 |
| 2011/0320422 A1* | 12/2011 | Denenberg et al. ............. 707/705 |
| 2012/0130548 A1* | 5/2012 | Fadell et al. ............. 700/278 |
| 2012/0158436 A1* | 6/2012 | Bauer et al. ............. 705/4 |

FOREIGN PATENT DOCUMENTS

| | | |
|---|---|---|
| EP | 1160707 | 12/2001 |
| EP | 1241599 | 9/2002 |
| EP | 1313043 | 5/2003 |
| EP | 1544771 | 6/2005 |
| EP | 1583013 | 10/2005 |
| JP | 61115198 A * | 6/1986 |
| JP | 2001118175 | 4/2001 |
| JP | 2001319051 | 11/2001 |
| JP | 2002092764 | 3/2002 |
| JP | 2002109229 | 4/2002 |
| JP | 2002133117 | 5/2002 |
| JP | 2002183456 | 6/2002 |
| JP | 2002329071 | 11/2002 |
| JP | 2002373259 | 12/2002 |
| JP | 2004013234 | 1/2004 |
| JP | 2004017901 | 1/2004 |
| JP | 2004059013 | 2/2004 |
| JP | 2004078393 | 3/2004 |
| JP | 2004240688 | 8/2004 |
| WO | WO-9921116 | 4/1999 |
| WO | WO-0111501 | 2/2001 |
| WO | WO-0163445 | 8/2001 |
| WO | WO-0163534 | 8/2001 |
| WO | WO-03058381 | 7/2003 |
| WO | WO-03065268 | 8/2003 |
| WO | WO-03090130 | 10/2003 |
| WO | WO-2004100043 | 11/2004 |

OTHER PUBLICATIONS

Ebipo Full-service tracking accessed using archive.org of 2009.*

How can I save money on my home insurance?—Ask Home Insurance.com, 2008.*

AIG Auto Insurance Launches GPS Based Teen Driver Pilot Program. (Apr. 9, 2007).

Butler et al. Driver Record: A Political Red Herring That Reveals the Basic Flaw in Automobile Insurance Pricing. J. of Insurance Regulation. 8:2, 200-234 (1989).

California Department of Insurance, Proposition 103, retrieved from the internet on Dec. 31, 2009 at www.insurance.ca.gov/.../prop-103cfm.

California One Step Closer to Pay as You-Drive, retrieved from the internet on Dec. 31, 2009 at www.carinsurancelist.com/news-pay-as-you-go . . . .

Chittim, G. Insure as you drive. KING5 News for Seattle. (Mar. 27, 2007).

Dorn, Ritter S K. Insurance Industry Databases. Bases de donnees dans le domaine de l'assurance. American International Group, Inc. U.S. Database: (Weston), vol. 21, No. 5, 1998, 68-71.

Fellingham et al. Comparing Credibility Estimates of Health Insurance Claims Costs. No. Ameri. Actuarial J. 9:1, 1-12. (2005).

Fetterolf, Don. Paradise Lost: Return on Investment in Disease Management. Health Watch. Issue 52, pp. 14-17. (May 2006).

Gallagher, Cecily. Risk Classification Aided by New Software Tool. National Underwriter Property & Casualty Risk Benefits and Management, No. 17, Apr. 27, 1992, 19.

German, J. Portable structure tester may bring better-built homes, shopping malls, skyscrapers. Sandia Lab News. 51:2. Jan. 29, 1999. [Retrieved on Jan. 23, 2008]. Retrieved from Internet URL: <http://www.sandia.gov/LabNews/LN01-29-99/aser_story.htm>.

IrisNet: The 'Seeing' Internet, www.intel.com, 2005.

Johnston, J. Vehicle's Black Box Holds Key to Crash (May 21, 2003). Retrieved from http://news.tbo.com.

Litman, T. Distance-Based Vehicle Insurance Feasibility, Costs and Benefits. Comprehensive Technical Report. Victoria Transport Policy Institute. (Jul. 8, 2004).

McGinty, Bill, "Protecting teenage drivers from themselves", 10Connects.com, Tampa Bay's 10 News. (Sep. 23, 2006).

Nerad, Jack. Insurance by the mile. (Dec. 22, 2004) Retrieved from http://www.drivers.com.

Rejda, Principles of Insurance, Longman Higher Education, 3rd ed., p. 230, May 1989.

(56) References Cited

OTHER PUBLICATIONS

Riegel et al. Insurance Principles and Practices, Prentice-Hall, Inc. pp. i-xi (1921).
Roberts, Gregory. Seattle Post-Intelligencer. Drive less during rush hour, get a lower insurance rate. (Mar. 27, 2007).
Steed, Judy. Winning Ways. Toronto Star, p. 3-4 (May 21, 2007).
Stehno, Chris E. What We Have Learned in the Last 50 Years—and Aren't Using. Health Watch. Issue 52, pp. 18-21. (May 2006).
The Lowdown Ways to Reduce the Premium on Homeowner's Insurance; [Chicago Sports Final Edition] Diana McCabe, Knight Ridder/Tribune. Chicago Tribune. Chicago, IL.:Aug. 25, 2000. p. 28 [Retrieved from Internet Apr. 27, 2007].
Vickrey, William. Automobile Accidents, Tort Law, Externalities, and Insurance: An Economist's Critique. Orig. pub. in Law and Contemporary Problems, 33:464-87 (1968).
Wenzel, T. Analysis of National Pay-As-You-Drive Insurance Systems and Other Variable Driving Charges. Lawrence Berkeley Lab., Univ. of Calif. (Jul. 1995).
Wolak, Dan. An Actuarial Response to the Health-Care Crisis. Society of Actuaries. Issue 47, 1-9. (Apr. 2004).
Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).

* cited by examiner

FIG. 2 insurancecompanywebsite.com - Windows Internet Explorer http://insurancecompanywebsite.com/

Is your property currently receiving remote monitoring services?  ● Yes   ○ No

Which one of the following is your service provider?

| ADT | Safeguard Home Security | Other |
|---|---|---|
| ● | ○ | ○ |

Can we obtain information from service provider regarding the type of monitoring service your property has?  ● Yes   ○ No Do you want to make monitoring data available to us?  ● Yes   ○ No Which one of the following sensors is used for monitoring your property?

| Burglar Detector | Water Leakage Sensor | Fire director | Carbon Monoxide Detector | Unknown |
|---|---|---|---|---|
| ○ | ● | ○ | ○ | ○ |

Can we use preferred emergency service providers when repair is needed?  ● Yes   ○ No

SYSTEM AND METHOD FOR AN AUTOMATED VALIDATION SYSTEM

CROSS-REFERENCE TO RELATED APPLICATIONS

This application claims the benefit of U.S. Provisional Application 61/365,180 filed on Jul. 16, 2010, the entirety of which is incorporated herein by reference.

FIELD OF INVENTION

In general, the invention relates to the field of validation systems and their use for determining insurance policy adjustments. More specifically, the invention relates to validating whether an insurance company's policyholders who are receiving certain insurance benefits as set forth in their insurance policies because of their use of remote monitoring services in fact are presently receiving such services.

BACKGROUND OF THE INVENTION

Insurance companies generally offer benefits to policyholders whose properties are receiving monitoring services from a remote monitoring service provider based on the reduction in the risk such services provide. These benefits are typically defined in a policyholder's insurance policy, which are adjusted when there are changes to the benefits the policyholder receives. One such benefit is premium discounts, which can be as much as 20% of the non-discounted premium. However, recent underwriting reviews have determined that many policyholders who are receiving such benefits no longer receive remote monitoring services, contrary to the information they had initially provided to the insurance company. This is not surprising given that many policyholders cancel their remote monitoring services after they obtain an insurance policy yet fail to timely inform the insurance company of such a cancellation. However, policyholders without such remote monitoring services should not receive or continue to receive the benefits because the risks associated with their properties are, in fact, not reduced. Conversely, there are policyholders who have recently installed such a monitoring system and should, therefore, be given appropriate benefits.

SUMMARY OF THE INVENTION

Thus, there exists a need for an efficient system that can repeatedly validate whether a policyholder's property is currently being monitored by a remote monitoring services provider so that an insurance company can use such a system to determine an adjustment to the policyholder's insurance policy.

Additionally, because different policyholders may use different types of remote monitoring services covering various aspects of his/her property to differing degrees, there also exists a need for a system that can determine a policyholder's policy adjustment based on the type and scope of coverage of the remote monitoring services the policyholder's property is receiving.

Allowing policyholders to continue to receive benefits after they have canceled their monitoring services reduces the incentive of the policyholders to continue their services with the service provider. At the same time, insurance companies and service providers generally do not want to share data with each other for various reasons, such as to protect the privacy of their policyholders, to protect the value of their customer lists, etc. Therefore, there exists a further need for a secure validation system to allow an insurance company and service providers to validate information provided by their respective customers without sharing each other's data or with a minimum amount of data sharing or exchange.

A system and method are disclosed herein for an automated validation system for repeatedly validating whether a property of a policyholder receiving an insurance benefit is presently receiving remote monitoring services as claimed by the policyholder.

The system comprises an application server in communication with a trusted third party server and a business logic computer. The application server obtains information from a database information about at least one policyholder who is responsible for at least one property covered under a property insurance policy offered by an insurance company. A portion of the information indicates that the at least one property of the at least one policyholder is receiving remote monitoring services from a service provider. The application server requests the trusted third party to validate whether the at least one property of the at least one policyholder is currently receiving remote monitoring services from the service provider. The application server stores the validation results in the database. The business logic computer determines an insurance policy adjustment given to the at least one policyholder based, at least in part, on the validation results stored in the database.

In some embodiments, the validation results include information about a type and a scope of coverage of remote monitoring services that the property is receiving. The policy adjustment comprises one of a change insurability of the property, policy premium discount, deductible, and dividend. The system further comprises a communication interface configured to notify the policyholder of the policy adjustment via at least one of mail, email, text messages, a web-based application, and telephone calls. The business logic computer is hosted on a same computer system as the application server. Based at least in part on the validation results, the business logic computer can determine a monetary penalty for the policyholder. The trusted third party server can prevent the insurance company and the service provider from exchanging their respective customer lists. The system further comprises a sensor data collection system configured to receive sensor data associated with the remote monitoring services. The sensor data collection system can communicate with the application server. The application server also communicates with an emergency service provider.

According to one aspect, the method comprises obtaining by an application server from a database information about at least one policyholder who is responsible for at least one property covered under a property insurance policy offered by an insurance company, wherein a portion of the information indicates that at least one property of the at least one policyholder is receiving remote monitoring services from a service provider. The method also comprises requesting, by the application server, a trusted third party server to validate whether the policyholder is receiving remote monitoring services from the service provider. The method further comprises storing by the application server in the database validation results received from the trusted third party. The method finally comprises determining by a business logic computer in communication with the application server an insurance policy adjustment given to the policyholder based at least in part on the validation results stored in the database.

According to yet another aspect, the invention relates to a non-transitory computer readable medium storing computer executable instructions, which, when executed by a processor, cause the processor to carry out the method and system functionality described above.

According to a further aspect, the system described above can validate whether a policyholder of an insurance company is receiving remote monitoring services without a trusted third party. The application server can communicate with a service provider server directly to perform the validation without revealing the identity of the policyholder to the service provider. The application server stores validation results in an insurance company's database. In some embodiments, the application server requests from the service provider server a hashed list of customers of the service provider who are receiving remote monitoring services for their properties. The validation results include at least a comparison between the hashed list of customers of the service provider and a hashed list of policyholders of the insurance company presently receiving at least one insurance benefit due to their usage of remote monitoring services for their properties.

BRIEF DESCRIPTION OF THE FIGURES

The methods and systems may be better understood from the following illustrative description with reference to the following drawings in which:

FIG. 2 is a diagram of a graphical user interface, in this instance, a web page, suitable for obtaining information relevant to insurance premium discounts, according to an illustrative embodiment of the invention;

DETAILED DESCRIPTION

To provide an overall understanding of the invention, certain illustrative embodiments will now be described, including a system and method for automated repeated validation of information provided by a policyholder for determining insurance discounts. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

A "property", as used herein, may be any personal assets, or residential, commercial, or public property and its associated building structures and grounds. Examples of a property include, without limitation, a home and its associated grounds, an apartment complex, a condominium building, an office building, aircrafts, boats, yachts, and ships. A "policyholder", as used herein, refers to both a potential customer and a current customer of an insurance company.

Insurance companies offer various kinds of insurance benefits to policyholders to encourage them to receive remote monitoring services for their properties. Any change related to the policyholder's use of remote monitoring services may trigger a change in the benefits that the policyholder receives, which may cause the insurance company to adjust the policyholder's insurance policy. To simplify discussions, the following descriptions are largely made in connection with adjusting insurance policies by adjusting policy premium discounts offered to policyholders based on information related to their use of remote monitoring services.

Figure 1:
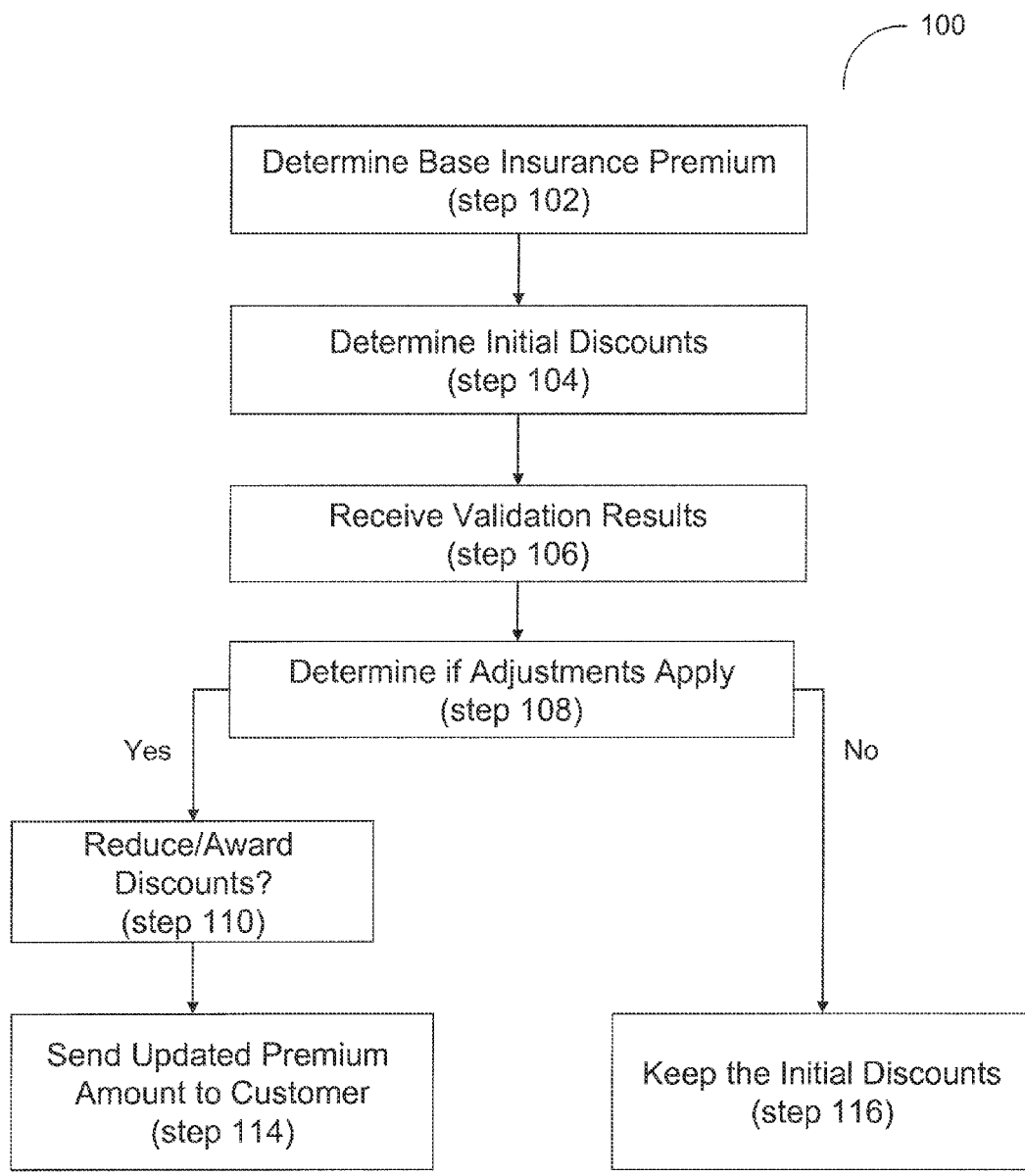
FIG. 1 is a flow chart of a method of determining insurance premium discounts according to an illustrative embodiment of the invention.

FIG. 1 is a flow chart of a method 100 of determining insurance premium discounts according to an illustrative embodiment of the invention. The method 100 begins with an insurance company determining a base insurance premium for insuring a piece of property (step 102). The insurance company may determine a base premium based on information provided by a policyholder and/or his/her insurance agent. Such information may include public information, prior information, historical information known to the insurance company, and/or information obtained from a third-party about the property and/or the policyholder.

After determining a base premium, the insurance company determines an initial discount for each policyholder (step 104). The discount in one implementation is a fixed discount. In another implementation, the discount is a variable discount determined, for example, to be a fraction of a particular coverage included in the policy, or a fraction of a premium associated with a corresponding peril covered by the policy, etc. Such a determination can be based on information submitted by a policyholder using forms available on a web page (see FIG. 2). Alternatively, or additionally, a policyholder and/or an insurance agent can provide information to an insurance company via other forms of communication, such as, without limitation, telephone calls, postal mail, or in-person communications. Examples of information that may be provided by a policyholder for determining premium discounts are illustrated in FIG. 2 and may include, for example, identification of a central monitoring service or the election of a policy that includes multiple coverages, including, e.g., auto and homeowners and personal umbrella coverage.

Frequently, information which led to a policyholder's initial discount changes. For example, a policyholder who obtained monitoring services when applied for a policy may cancel the services during the term of the policy. Accordingly, the insurance company, on a regular or irregular basis, validates, or verifies, the information that led to the initial discounts. For example, the insurance company may validate the information daily, weekly, bi-monthly, monthly, quarterly, at the end or beginning of every insurance term, randomly, or intermittently. To do so, the insurance company receives validation results about its policyholders' use of remote monitoring services from either a service provider or a trusted third party (step 106). Based on the received validation results, the insurance company determines if a policyholder's initial discount should be adjusted (step 108).

If the received validation results indicate that a policyholder's remote monitoring services status has since changed, the insurance company either reduces or increases the policyholder's initial discounts based on the change or other current information related to the policyholder's remote monitoring services (step 110). A reduction of an initial discount could result in the insurance company withdrawing the discount completely, offering a lesser amount of discount, or imposing a monetary penalty. A policyholder who was previously not offered any discount but is currently receiving monitoring services for his/her property may be awarded a premium discount. Once changes are determined, the insurance company updates data stored in its database to reflect these changes. In some embodiments, once the monitoring services are canceled, the insurance company also lowers a policyholder's coverage limit, as equipment, such as monitoring sensors, associated with the remote monitoring services would no longer be covered, thereby reducing the inventory of goods covered under the policyholder's current policy.

After updating a policyholder's insurance premium or premium discount, the insurance company informs a policyholder of his/her updated premium amount (step 114). The policyholder may be notified via email or via an online account with the insurance company. In other implementations, to ensure the receipt of the notification, the insurance company may notify the policyholder of the change in premium or discount via a postal mail, email or SMS.

If the received validation results confirm the information previously stored in the insurance company's database, a policyholder's initial discount remains unchanged for that validation cycle (step 116). In some embodiments, a policyholder can receive an additional discount for keeping his/her information up to date with the insurance company.

In addition to indicating whether a policyholder is still receiving remote monitoring services, validation results may also include information regarding, for example, the type of remote monitoring services that a policyholder is presently receiving for his/her insured property, which may also change from time to time. Different types of remote monitoring services offer various kinds of security protection; some are of a higher security level than others, and some offer more comprehensive protections than others. In addition, different services also employ different kinds of technology, which offer different levels of safety to the insured properties. For example, some remote monitoring services for protecting against burglary use window alarms for detecting break-ins while other services use laser sensors implemented around the premises of a property. Validation results that the insurance company receives may also include information about the technology used as part of a policyholder's remote monitoring services to allow the insurance company to better determine a policyholder's premium discount such that a policyholder with more advanced remote monitoring services or technology receives a greater discount than policyholders with less advanced remote monitoring services.

In some implementations, as mentioned above, the discount that a policyholder receives may be a variable discount determined to be a fraction of a premium associated with a corresponding peril covered by the policy. Using a home owner's insurance as an example, a policyholder's policy may cover perils such as theft. If a policyholder's property is receiving active anti-theft remote monitoring services for preventing insurance losses associated with theft, the premium discount that the policyholder receives may be a fraction of the portion of the premium that the policyholder is paying for covering the theft peril. Determining a discount based on potential insurance losses that a policyholder's remote monitoring service can prevent encourages the policyholder to continue with the same service, as the benefits of having such a service are now more apparent to the policyholder. Other perils that may be covered under a property insurance policy include, without limitation, fire, lightning, explosion/implosion, aircraft damage, storm, flood, and landslide.

The discount may vary based on other factors, as well. For example, an insurance company may determine a discount for a policyholder based on utilization data related to the policyholder's use of remote monitoring services. Such data may indicate how frequently the policyholder activates the monitoring system, conducts maintenance check-ups on the system, and/or any other information about how such services are being utilized by the policyholder. This way, policyholders who more frequently activate their monitoring systems, for example, receive a greater discount. An insurance company can obtain utilization data directly from a service provider or from a third-party data provider, or by driving from its internal system.

In addition to using information about the property's remote monitoring services for determining a discount, an insurance company may also vary a policyholder's discount based on information about the neighborhood in which a policyholder's property is located. Such neighborhood information may include, for example, the neighborhood's crime rate, average income of all the households in the neighborhood, average property value, and demographics of people residing in the neighborhood. Doing so allows the insurance company to more fairly assess potential insurance risks associated with a policyholder's property, which in turn, allows the insurance company to more fairly determine a policy premium, or premium discount, for the policyholder. For example, a high-crime neighborhood tends to have higher risks of burglary in comparison to a low-crime neighborhood. Therefore, for high-crime neighborhoods, receipt of remote monitoring services may provide a greater benefit than receipt of such services in low-crime neighborhoods. To encourage the use of remote monitoring services in a high-crime neighborhood, policyholders living in a high-crime neighborhood with remote monitoring services may receive a greater premium discount than policyholders in a low-crime neighborhood. In addition, the discount may vary based on the number or percentage of properties in a neighborhood receiving monitoring services. A property located in a neighborhood with a greater usage of remote monitoring services receives a greater discount as this neighborhood characteristic further deters theft in the neighborhood. It also has the added benefit of encouraging further use of such services in the neighborhood, improving all residents' safety.

In some embodiments, an insurance company provides policyholders belonging to the same neighborhood, apartments building, condominiums building, or office building with information related to the use of remote monitoring services in their neighborhood. For example, policyholders may receive information about the total number of households or companies belonging to their neighborhood which are receiving remote monitoring services for their properties. The policyholders can receive such information via email, mail, or text messages. The insurance company can also provide a social media website where information about each neighborhood may be posted and shared among policyholders living in the neighborhood. Each policyholder of a neighborhood can, for example, log onto his/her neighborhood's web page on the social media website to view real-time information about the use of remote monitoring services of others living in the same neighborhood. In some embodiments, policyholders of different neighborhoods may also share their information on the social media website. Offering such a social media website allows policyholders to encourage one another to use remote monitoring services as doing so improves the overall safety of their neighborhood, benefiting everyone in the neighborhood. To protect policyholders' privacy and identities, particularly those without remote monitoring services, identifying information about each policyholder is not revealed such that members, or policyholders, of the social media website can only communicate with one another virtually unless the members choose to reveal their identifying information.

Though the foregoing discussions are made in relation to offering insurance premium discounts to policyholders whose properties are receiving remote monitoring services, an insurance company may offer other kinds of insurance benefits in addition to or in replacement of a premium discount. For example, in some instances, the insurance company may offer to pay for or reimburse a portion of the cost associated with receiving a remote monitoring service and any equipment or systems needed for the service. As another example, the insurance company may lower a policyholder's deductible, e.g., from 2% to 1.5%, or issue credits, e.g., $100, to a policyholder's account with the insurance company that the policyholder may use to pay for insurance-related expenses in the future. The details of an illustrative suitable system and method for administering such payments are further described in co-pending U.S. patent application Ser. No. 12/254,215, the entirety of which is incorporated herein by reference.

If policyholders offered with such alternative forms of incentives cancel their remote monitoring services, the insurance company withdraws its previous offer and/or impose an additional monetary penalty. For example, the insurance company may request the policyholder to repay the cost that the insurance company had paid initially for covering costs associated with purchasing remote monitoring services and the associated equipment.

FIG. 2 is a diagram of a graphical user interface, in this instance, a web page 200, suitable for obtaining information relevant to insurance premium discounts, according to an illustrative embodiment of the invention. The web page 200 includes a series of questions, the answers to which may be used by a business logic computer for determining a policyholder's initial discounts at step 104. Each policyholder may receive a web account with which he/she can provide relevant information used for determining insurance premium discounts by the insurance company. In the case where a policyholder has selected "Yes" to the question "is your property currently receiving remote monitoring services" on the web page 200, the policyholder may be prompted to respond to a list of additional questions specific to the monitoring services. If the policyholder has selected "No" to the question, the insurance company may inform the policyholder that discounts can be received if the property receives remote monitoring services, thereby encouraging the policyholder to obtain remote monitoring services for his/her property. The insurance company may further indicate on the web page 200 an estimate of discounts. The insurance company may also provide to the policyholder a list of preferred remote monitoring service providers and their contact information. The policyholder may then contact the providers directly or be routed to a preferred provider's website from the web page 200.

After selecting "Yes" to the question asking whether monitoring service is being provided, the policyholder may be asked to identify which of the listed service providers is providing the remote monitoring services to the policyholder's property. If "Other" has been selected, the policyholder may be given the option to provide the name of the service provider. The insurance company may also request permission to obtain information from the service provider regarding the type and status of the monitoring service the policyholder's property has. If the user grants the request, the insurance company periodically or intermittently, through an automated validation system, verifies whether the insured property is presently receiving the remote monitoring services or any other information pertinent to the determination of premium discounts. For example, the insurance company can also periodically or intermittently verify whether the type of monitoring services that the insured property is receiving has changed since the last validation cycle. This way, policyholders no longer need to update the information on file with the insurance company if it changes, because the stored information is updated automatically by the insurance company.

The insurance company may further ask the policyholder to grant it access to monitoring data. Monitoring data may be data collected by various sensors currently implemented as part of the remote monitoring system for detecting a variety of conditions of the property, including, without limitation, fire hazards, carbon monoxide levels, water leakage, break-ins, low temperatures, etc. Having real-time data transmitted to the insurance company enables the insurance company to proactively detect, or identify a potential cause of loss and quickly eliminate the cause to prevent any damages from occurring, or mitigate a loss after it has occurred. Emergency service providers (e.g., fire departments, hospitals, policy stations, plumbing companies, electricians, etc.) may be contacted directly after a potential cause of loss is detected. For example, the real-time sensor data can indicate that pressure exerted on a water pipe has exceeded a threshold value and a potential rupture of the pipe may occur. As another example, the sensor data can indicate that a gas stove was left on and is currently emitting carbon monoxide. Having access to the monitoring data can also assist the insurance company in determining and processing damage claims without having to involve the policyholder to contact the insurance company for on-site damage assessment. Other benefits and methods for having access to monitored data are described in U.S. Pat. Nos. 7,610,210 and 7,711,584, the entirety of which are herein incorporated by reference.

Using the web page 200, the insurance company may also ask the policyholder to select the type of sensor used in the remote monitoring system. For example, the service elected by the policyholder may include a water leakage sensor for detecting water leakage. Selection of one sensor is not mutually exclusive of the selection of another. Many remote monitoring systems come with a variety of sensors installed on the premises of a property for monitoring various aspects of the property. Such detailed information may be used by the insurance company's business logic computer to determine additional discounts that the policyholder may qualify for (step 106). For example, a policyholder with both a burglary detector and a water leakage sensor may receive a greater insurance discount than a policyholder with only a burglary detector, since the risks are lower for a property receiving more comprehensive monitoring services. However, if the policyholder does not know what type of sensor is used as part of the monitoring system, the insurance company may, after receiving the policyholder's consent, request such sensor data be sent from a sensor data collection center, either directly or indirectly via a trusted third party.

The insurance company may also ask the policyholder if the policyholder wishes to use preferred emergency service providers to prevent or mitigate a loss when a repair or other preventive or remedial services are needed (e.g., to put out a fire, to eliminate a source of carbon monoxide, to relieve water pressure in a pipe before rupture, or to remove standing water from a basement). A preferred service provider that is not a public entity, e.g. a fire department, may also be referred to as an in-network service provider in an insurance company's private network. By selecting such an in-network or preferred emergency service provider, a policyholder may receive a greater discount as a result than a policyholder who chose to use an out-of-network service provider. Preferred emergency service providers may be contacted directly after detecting that a potential loss might occur or after an incident is detected. This way, potential hazards or losses may be eliminated before they mature into actual incidents. If an incident is not averted, the service provider, by being timely notified of the incident, may be able to mitigate the potential losses associated with the incident. Once an incident does occur, the policyholder may also avoid any hassles associated with finding emergency service providers covered under an elected insurance policy. Since preferred emergency service providers have established business relationships with the insurance company and/or the remote monitoring service providers, bills incurred by any emergency service provider may automatically be sent to the insurance company, instead of the policyholder, who typically has to file claims him/herself.

It should be noted that the questions listed on web page 200 may be filled out by a policyholder or the policyholder's insurance agent. Additionally, the listed questions are used only as examples of information that may be relevant to an insurance company for determining insurance premium discounts that a policyholder is eligible for. Since an insurance company needs to validate information about its policyholders against information that a service provider may have about these policyholders if they are also customers of the service provider, questions depicted on web page 200 may include or be made based on questions that a remote monitoring service provider generally gives to its customers.

In some embodiments, questions depicted on web page 200 are delivered to policyholders via mail, posed over the phone, or disseminated via another mode of communication. A policyholder can also return his/her answers to these questions via mail, orally, or otherwise. Insurance personnel can update an insurance company's electronic database by storing the answers.

Figure 3:
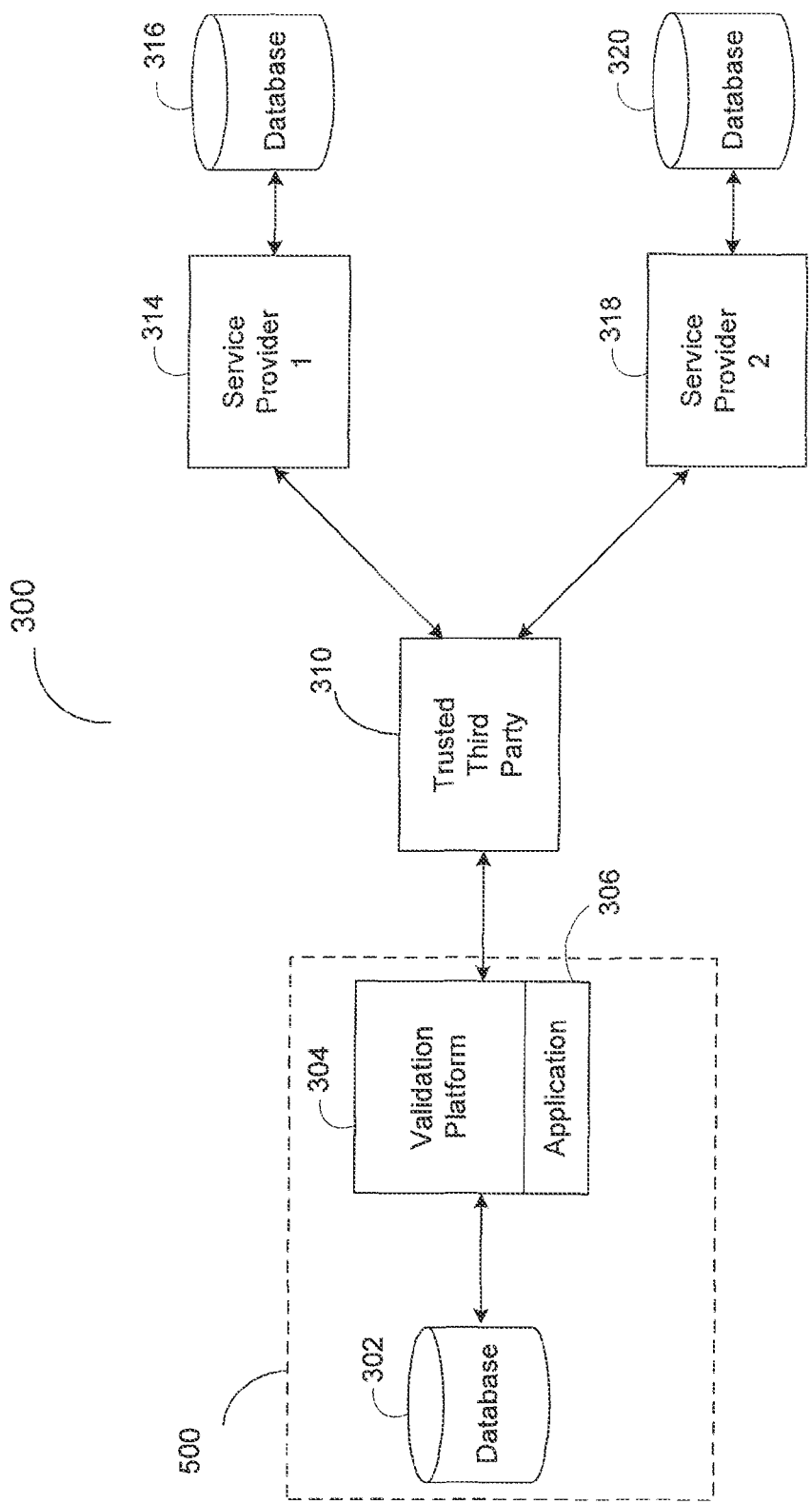
FIG. 3 is a peer-to-peer architectural model of an automated validation system, according to an illustrative embodiment of the invention.

FIG. 3 is a peer-to-peer architectural model of an automated validation system 300, according to an illustrative embodiment of the invention. The validation system 300 includes an insurance company's validation platform 304, which supports an application 306. The validation platform 304 may support additional applications provided by other entities. The application 306 may also include a web application to support the web page 200. The validation platform 304 and application 306 can communicate with the insurance company's database 302 using a peer-to-peer communication protocol. The database 302, validation platform 304 and application 306 may be part of a computer system 500, a description of which is provided below with respect to FIG. 5. Alternatively, or in addition, these components may be located separately in different computer systems. The validation platform 304 and application 306 are connected to a trusted third party 310, also using a peer-to-peer communication protocol. The trusted third party 310 may be a computer system, such as a server, run by a third party company for processing data received between two relying parties, such as the insurance company and one or more service providers. The trusted third party 310 is connected to service provider 314 and service provider 318, also using a peer-to-peer communication protocol. Service provider 314 and service provider 318 are also connected to a database 316 and 320 respectively. The automated validation system 300 may be based on Secure Multiparty Computation/Communication (Secure MPC) to protect the privacy and anonymity of the insurance company's policyholders as well as that of the customers of the service providers 314 and 318. Alternatively, or in addition, the insurance company's validation platform 304 may communicate directly with the service providers 314 and 318 without communicating through the trusted third party.

Validation platform 304 may utilize or combine any one of well-known software development platforms, open or closed, such as Microsoft .NET, Java, Adobe AIR, Steam, etc. Operating system platforms for supporting the validation platform 304 may include: Microsoft Windows, Unix, MAC OS, Solaris, IBM DB2, or any virtual machine operating system platforms. The platforms, applications, and operating systems may run on a computer system 500, a server, or the like. The validation platform 304 may include an Application Programming Interface, API, which would allow easy plug-ins of other entities' applications to communicate with application 306. Databases 302, 316, and 320 may be any well-known memory or storage elements capable of retaining or storing electronic data. Databases 302, 316, and 320 may also include database applications, drivers, middleware, firmware, and/or operating systems to allow the retrieval and storing of data.

In operation, the application 306 may first query the database 302 for a list of policyholders who are currently receiving property insurance premium discounts. The application 306 may then filter the list to identify policyholders who are receiving discounts because their properties are receiving remote monitoring services. The application 306 may further identify the names of the service providers for the list of policyholders currently receiving insurance discounts, which may be based on information previously submitted to the database 302 via web page 200. Once the names of the service providers are identified, the application 306 provides the names of the service providers to the trusted third party 310 who establishes communication with the computer systems of the identified service providers. To protect policyholders' privacy and their data security, the establishment of communication may follow protocols typically associated with a secure MPC system in which data to be transmitted and received are routed through a trusted third party 310. A trusted third party 310 may compare the name of a policyholder against names of all the service providers' customers to determine if a match has been found. Once a match has been identified, the trusted third party 310 may obtain additional data about that policyholder from the service provider and create validation results to reflect such a match and/or any other relevant information. By having the trusted party compare data received from the insurance company and the service providers, the insurance company can avoid revealing the identities and sensitive information of its policyholders to other entities, as might be required by contract, law, or other constraints, while still allowing the insurance company to validate its stored information about its policyholders. Similarly, service providers also benefit from such a trusted system as their customers' data is also protected and not shared with other parties or entities.

For policyholders who have been identified in the service providers' database 316 or 320, the trusted third party 310 requests from the service providers their services status to determine whether they are presently receiving remote monitoring services. In an alternative embodiment, the service providers deliver their customers' current service status along with the initial customer list directly to the trusted third party 310. Once the trusted third party 310 determines that the policyholders are indeed receiving the remote monitoring services, validation results may be sent back to the application 306 which may, in turn, provide the results back to the business logic computer of the insurance company for further processing.

If the trusted third party 310 determines that some of the insurance company's policyholders do not match any customers' names in the service providers' databases, the trusted third party 310 may first approximate the names of the policyholders to be within a predefined code distance apart from the original names to determine alternate names that may be stored in the service providers' databases. The trusted third party 310 may also store in its system a phonetic algorithm, such as Soundex, used for indexing names by sound, as pounced in English, so that different versions of a name may be standardized or normalized. Other information that can aid in this process may include the policyholder's permanent mailing address, telephone number, or spousal name, if any, and/or social security number etc. After the approximation analysis, if the trusted third party 310 is still unable to identify the policyholders in the service providers' databases, the trusted third party 310 may flag the policyholders as not receiving remote services and send the results back to the application 306.

In some embodiments, for a policyholder whose name does not match any customers of the service providers, as verified by the trusted third party 310, the insurance company can request these policyholders to i) verify information stored in the database 302 to correct any errors in their names and/or street addresses stored in the database 302, 316, and/or 330, and/or ii) provide proof of remote monitoring services, such as bills received from the service provider. This way, the insurance company can avoid mistakenly withdrawing premium discounts offered to these policyholders due to a computational error. If a policyholder has different information stored in the database 302, (e.g. the last name has since changed), the insurance company may send the updated data to the trusted third party 310 for re-validation.

In some instances, some of the policyholders no longer receive the remote monitoring services from the service providers 314 or 318. Accordingly, the service providers 314 and 318 may provide data indicating termination of service of these policyholders to the trusted third party. Before sending such data, the service providers 314 and 318 may first determine the nature of the terminated service. In some cases, the policyholders' services may have been terminated because payment for the services was past due for a predefined amount of time. In those cases, data sent by the service providers 314 and 318 may reflect such information so that the insurance company may, instead of withdrawing discounts from the insurance premiums, remind the policyholders that the remote monitoring services need to be reactivated for them to continue to receive the insurance discounts. It should be noted that there are other scenarios in which an unintentional temporary lapse of service can occur and those scenarios should be handled differently from an intentional cancellation.

In instances where the cancellation of remote monitoring services was intentional, the service providers 314 and 318 may provide data that would reflect such an intentional cancellation to trusted third party 310. The trusted third party 310 may then embed such information in the validation results of that policyholder to the insurance company's application 306. The application 306 may send data to the business logic computer for adjusting the insurance discounts accordingly. In some embodiments, the application 306 can generate automatic notifications to the policyholders indicating that termination of monitoring services will cause the withdrawal of premium discounts. The policyholders may be given a predefined period of time to renew the monitoring services in order to continue benefiting from the discounts. Alternatively, the policyholder may be given the option to provide proof of receiving the monitoring services in case such determination of terminated service was incorrect or the policyholder has since changed service provider. In other embodiments, the insurance company can simply withdraw the discounts when the validation results reflect the termination of services.

In some scenarios, the service providers can provide the insurance company, via the trusted third party 310, with the date of termination of the monitoring services for a given policyholder. Thus, the application 306 may further calculate discounts that were given to the policyholder when they were not in fact eligible. The insurance company 306 can then retroactively bill the policyholders for the discounts that were incorrectly given to them. In other instances, the insurance company can also be given the information indicating hat the policyholders have either upgraded or downgraded the monitoring services. For example, for the policyholders who have previously submitted through the forms on web page 200 that the insured property is receiving anti-burglary, water leakage, and fire detection monitoring services, but has since changed the monitoring services to cover only anti-burglary, the insurance company can revoke some portions of the initial discount, since the risks associated with the insured property have increased due to the downgrade of monitoring services. As another example, some policyholders may have upgraded their services to include both anti-burglary and carbon monoxide detection as opposed to only anti-burglary; the insurance company will, upon receiving such information by the application 306, credit the policyholders additional discounts for lowering their property's insurance risks.

After validating the stored information about policyholders who have been receiving property discounts, the application 306 may then generate a list of remaining policyholders who are not currently receiving the discounts. The insurance company may then send the list to the trusted third party 310 to identify policyholders who are eligible for discounts but have not provided relevant information that would trigger the discounts. In other words, to ensure that qualified policyholders are receiving their eligible discounts, the application 306 may query the database 302 for a list of policyholders without discounts. The trusted third party 310 may perform the same analysis as mentioned before and return validation results to the application 306. If the identified policyholders without discounts do not exist in the service providers' databases 316 and 320, the insurance company may keep the insurance premium at the same level. In some implementations, the application 306 can remind the policyholder that receiving monitoring services for his or her property will qualify him/her for premium discounts. If the identified policyholders without discounts are customers of the service providers, the business logic computer may update and apply the insurance premiums accordingly. Finally, the application 306 may generate an automatic notice, delivered via email or postal mail, to the policyholder informing him or her of the discounts. Accordingly, names and information of policyholders who are now identified as having the monitoring services may be indexed and stored among other policyholders who are currently receiving discounts associated with property monitoring services.

It should be noted that additional trusted third parties or service providers may be included in the validation system 300. As a simple illustration, only two service providers and one trusted third party are illustrated in FIG. 3. The API of the validation platform 304 may allow easy plug-ins of additional service providers' applications for communicating with the application 306. Alternatively, the insurance company, service providers, and trusted third party may identify an agreed-upon protocol for communicating among themselves, without using an API. The validation system 300 may also be configured in such a way to avoid future validation requests from the insurance's application 306. That is, once a list of policyholders has been provided to the trusted third party 310, no repeated requests for validation of these policyholders are needed from the insurance company. In fact, only changes in the list of policyholders may be sent to the trusted third party 310 (e.g., new policyholders, etc.). Similarly, the trusted third party 310 may receive only changes in the customer list and/or account status of existing customers of the service providers.

In alternative implementations, application 306 and service providers 314 and 318 may communicate with each other directly, without using a trusted third party 310. In these implementations, the data comparison and validation may be done by either a computer system of the insurance company or the service providers in such a way that information, or data, about their respective customers is not shared among themselves in a fashion that would disclose private or proprietary information as described further below.

Figure 4:
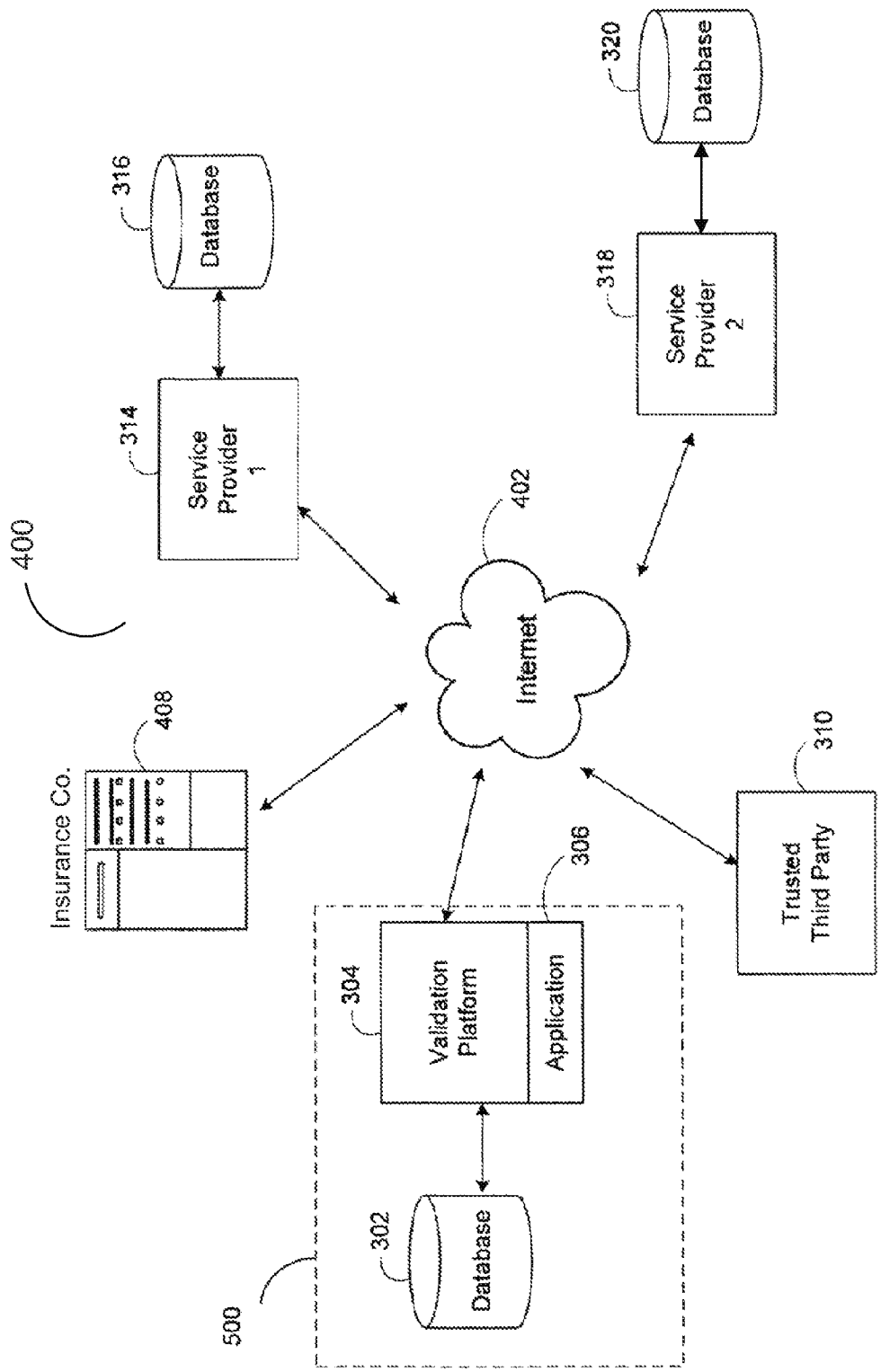
FIG. 4 is a client-server architectural model of an automated validation system, according to an illustrative embodiment of the invention.

FIG. 4 is a client-server architectural model of an automated validation system 400, according to an illustrative embodiment of the invention. The automated validation system 400 includes a validation platform 302, which hosts an application 306. Both the validation platform 304 and application 306 may be connected to a database 302 through a local area network directly or through internet 402. The validation system 400 also includes a trusted third party 310 and service providers 314 and 316. The service providers 314 and 318 are connected to databases 316 and 320 respectively. Service provider systems 314 and 318 may link to databases 316 and 320 through a local area network or the internet 402. The validation system 400 also includes an insurance company 408 for hosting one or more applications related to determining insurance premiums, such as the business logic application or system. Each component of the validation system 400 may also communicate with one another, directly or indirectly, through the internet 402. In some implementations, where the validation system 400 conforms to the standards and protocols of a Secure MPC system, the application 306 of the validation platform 304 communicates with the service providers 314 and 318 respectively via the trusted third party 310. The trusted third party 310 compares data received from both the insurance company and the service providers. The trusted third party 310 creates the validation results based on the comparison data and sends the results to the insurance application 306. Various software and/or system level software and hardware components that are suitable for the validation platform 304 are described above with respect to FIG. 3. The databases 302, 316, and 320 may be hosted by the same physical storage elements, portions of which may be partitioned to allow the access of the application 306 and/or the service providers 314 and 316. A detailed hardware description and examples of a database are provided in the description of FIG. 5.

As described with respect to FIG. 3, application 306 of the insurance company may request the trusted third party 310 to validate information stored in its database 302. In particular, the application 306 may allow the insurance company to communicate with the trusted third party to validate whether its insured properties are receiving monitoring services as claimed by its policyholders. The application 306 may query the insurance company's database 302 for a list of policyholders who are benefiting from the discounts and may then identify names of the service providers for providing the monitoring services to the policyholders' properties. The identified service providers who have applications hosted on the validation platform 304 may return their customers' data to the trusted third party 310, which computes and returns the validation results to the insurance company. The validation results may be received by the application 306 and processed by the business logic computer located either on the validation platform 304 or at the insurance company 408. If the business logic computer is located remotely at the insurance company 408, the application 306 may communicate with the business logic computer via the internet. Depending on the validation results, the insurance premium discounts may then be determined according to the method described with respect to FIG. 1.

In some implementations, instead of communicating with the service providers 314 and 318 via the trusted third party 310, the application 306 may communicate directly with the service providers 314 and 318. To protect the anonymity of the insurance company's policyholders, the insurance company may hash the names of the policyholders whose account status of the remote monitoring service is to be determined by the service providers 314 and 318. Alternatively, or additionally, the insurance company may also hash other identifying information about its policyholders, such as their permanent mailing addresses, social security card numbers, telephone numbers, and/or spousal names, if any. The validation platform may support shared one-way hash functions, such as SHA-512, to allow both the application 306 and service providers 314 and 318 to hash their customers name and/or street addresses using the same hash function. For example, the application 306 may use a one-way hash function to hash all the names of policyholders whose account status is to be validated. The application 306 may send the hash values associated with each policyholder and information about which hash function was used to the service providers 314 and 318. The service providers 314 and 318 may then hash their customers using the same hash function and return their hash values to the application 306 for comparison. To combat dictionary attack or other common attacks associated with one-way hash functions, the insurance company may further store a list of salt (strings used to randomize and increase the length of data to be hashed) to be concatenated with the names, or other identifying information, of the policyholders to randomize the value to be hashed. The salt could be, for example, binary strings (e.g., ASCII codes) for "Yes" and/or "No". Alternatively, the insurance company may use information about the type of remote monitoring services that a policyholder has elected for his/her property as the salt. This way, the insurance company can verify whether the policyholders exist in the database of a service provider without exposing the names or detailed information about its policyholders to the service provider. This can also prevent hackers from intercepting their stored data.

In other implementations, policyholders who are also customers of service providers 314 and 318 may directly validate the account status in accordance with the open standard OAuth, which allows users to grant a third party site access to their information stored in another party's website, such as a service provider's website. Such authorization protocols or standards have been generally used in the field of social media. However, similar concepts can supplement or replace the existing secure MPC models in which information received from two relying parties are being accessed and processed by a trusted third party. To use OAuth, policyholders of the insurance company would need to establish an online account with both the insurance company and with the service providers. A policyholder may first log into his/her account with the insurance company. Subsequently, the policyholder may log into his/her account with the service provider 314. The insurance company can receive a token from the service providers' website after the policyholder has successfully logged into the service provider's website. The token may indicate to the insurance company that the policyholder indeed is an active customer of the service provider. Once a communication session is established after the policyholder has logged onto both accounts, other information stored in the service provider's databases 316 and 320 may be shared with the insurance company's application 306, without providing the insurance company direct access to the policyholder's account with the service providers, and vice versa.

Figure 5:
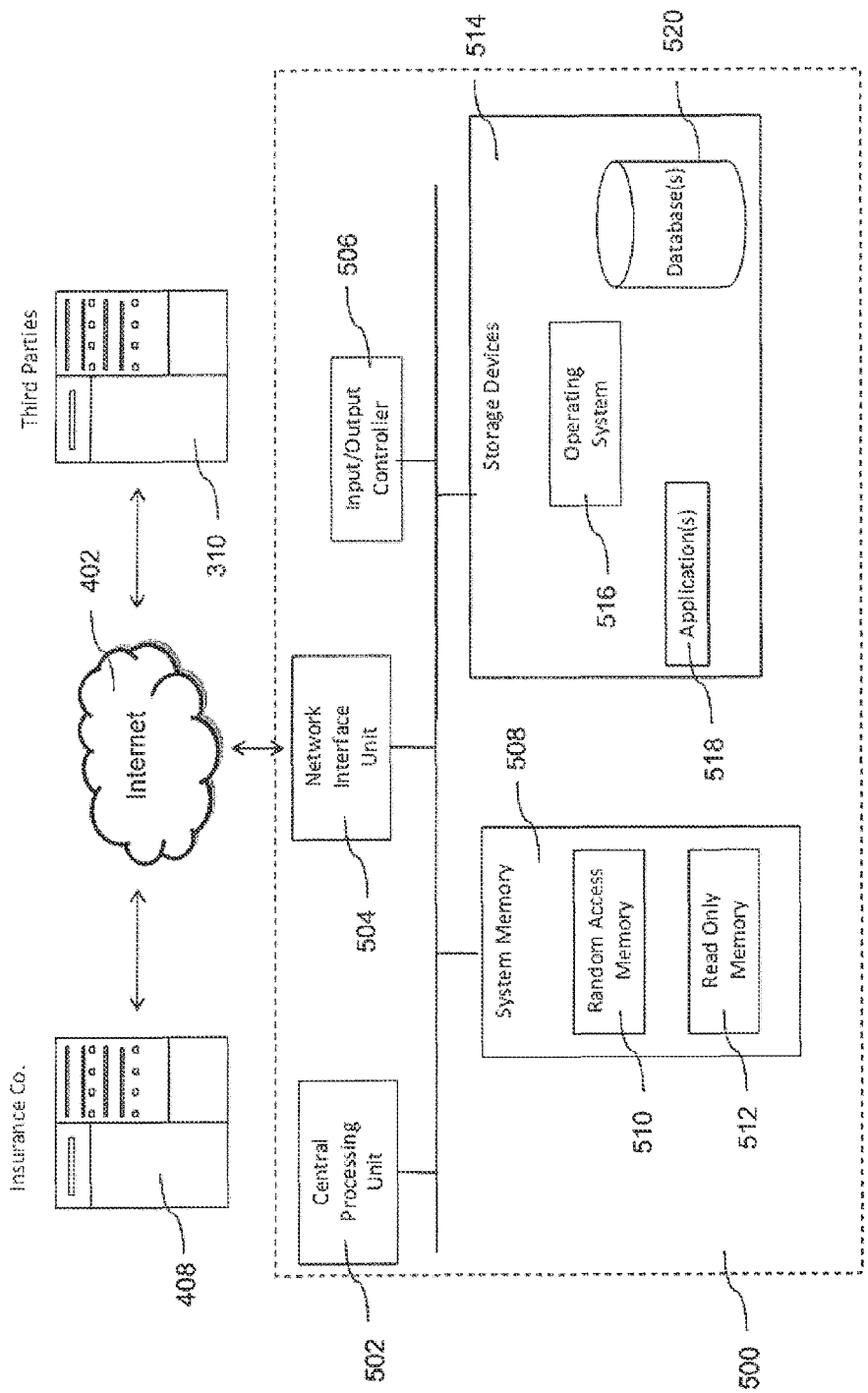
FIG. 5 is a block diagram of a computer system used in FIGS. 3 and 4, according to an illustrative embodiment of the invention.

FIG. 5 is a block diagram of a computer system 500 used in FIGS. 3 and 4 for supporting various software applications or application platforms such as the validation platform 304, according to an illustrative embodiment of the invention. Computer system 500 comprises at least one central processing unit (CPU) 502, system memory 508, which includes at least one random access memory (RAM) 510 and at least one read-only memory (ROM) 512, at least one network interface unit 504, an input/output controller 506, and one or more data storage devices 514. All of these latter elements are in communication with the CPU 502 to facilitate the operation of the computer system 500. The computer system 500 may be configured in many different ways. For example, computer system 500 may be a conventional standalone computer or alternatively, the function of computer system 500 may be distributed across multiple computer systems and architectures. In the embodiment shown in FIG. 4, the computer system 500 is linked, via network 402 (also described in FIG. 4), to an insurance company computer system 408 which may house a portion of the business logic that may be called by the application 306 for determining insurance premium discounts.

Computer system 500 may be configured in a distributed architecture, wherein databases and processors are housed in separate units or locations. The computer system 500 may also be seen as a server located either on site near the insurance company 408, or can be accessed remotely by the insurance company 408. Some such units perform primary processing functions and contain at a minimum, a general controller or a processor 502 and a system memory 508. In such an embodiment, each of these units is attached via the network interface unit 504 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 502 comprises a processor, such as one or more conventional microprocessors and one or more supplementary co-processors such as math co-processors for offloading workload from the CPU 502. The CPU 502 is in communication with the network interface unit 504 and the input/output controller 506, through which the CPU 502 communicates with other devices such as other servers, user terminals, or devices. The network interface unit 504 and/or the input/output controller 506 may include multiple communication channels for simultaneous communication with, for example, other processors, servers or client terminals. Devices in communication with each other need not be continually transmitting to each other. On the contrary, such devices need only to transmit to each other as necessary, may actually refrain from exchanging data most of the time, and may require several steps to be performed to establish a communication link between the devices.

The CPU 502 is also in communication with the data storage device 514. The data storage device 514 may comprise an appropriate combination of magnetic, optical and/or semiconductor memory, and may include, for example, RAM, ROM, flash drive, and/or an optical disc such as a compact disc and/or a hard disk or drive. The CPU 502 and the data storage device 514 each may be, for example, located entirely within a single computer or other computing device, or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 502 may be connected to the data storage device 514 via the network interface unit 504.

The data storage device 514 may store, for example, (i) an operating system 516 for the computer system 500; (ii) one or more applications 518 (e.g., computer program code and/or a computer program product) adapted to direct the CPU 502 in accordance with the present invention, and particularly in accordance with the processes described in detail with regard to the CPU 502; and/or (iii) database(s) 520 adapted to store information that may be utilized to store information required by the program. In some embodiments, the database(s) 520 store(s) policyholder information such as information relevant to determining the insurance premium discounts, base premium, property insurance compliance guidelines for one or more jurisdictions, policyholder policy provisions for one or more different types of insurance policies, claims information, and/or prior records of the policyholder's property and the like.

The operating system 516 and/or applications 518 may be stored, for example, in a compressed, uncompiled and/or encrypted format, and may include computer program code. The instructions of the program may be read into a main memory of the processor from a computer-readable medium other than the data storage device 514, such as from the ROM 512 or from the RAM 510. While execution of sequences of instructions in the program causes the processor 502 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as determining insurance premium discounts of policyholders based on validation results associated with their remote monitoring services. The program also may include program elements such as an operating system, a database management system and "device drivers" that allow the processor to interface with computer peripheral devices (e.g., a video display, a keyboard, a computer mouse, etc.) via the input/output controller 506.

The term "computer-readable medium" as used herein refers to any non-transient medium that provides or participates in providing instructions to the processor of the computing device (or any other processor of a device described herein) for execution. Such a medium may take many forms, including but not limited to, non-volatile media and volatile media. Non-volatile media includes, for example, optical, magnetic, or opto-magnetic disks, such as memory. Volatile media includes dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 502 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 6:
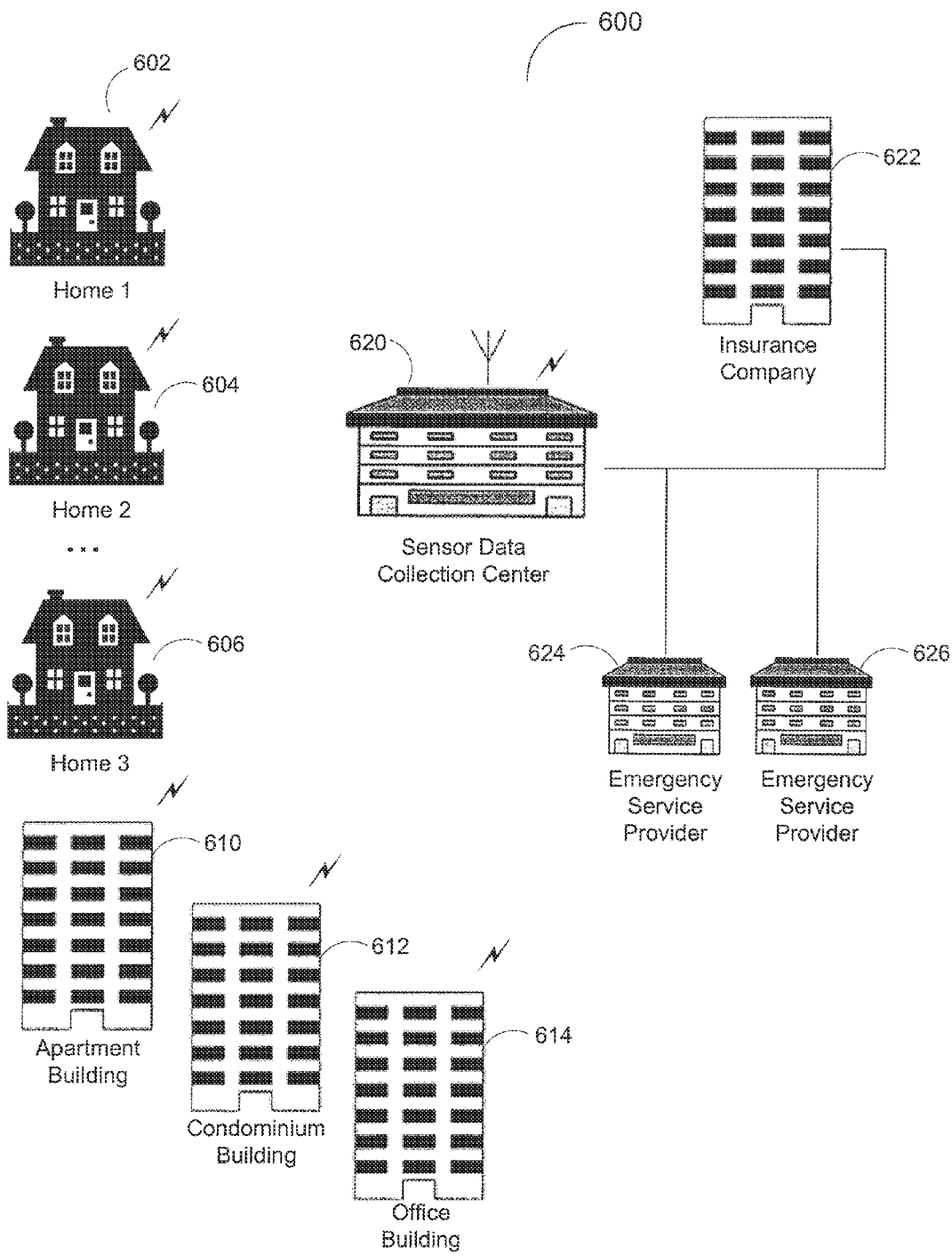
FIG. 6 is a schematic diagram of an insurance scenario, according to an illustrative embodiment of the invention.

FIG. 6 is a schematic diagram of an insurance scenario 600, according to an illustrative embodiment of the invention. The insurance scenario 600 comprises a network of properties, which includes a home 602, 604, and 606, an apartment building 610, a condominium building 612, and an office building 614. The scenario 600 also includes a sensor data collection center 620, an insurance company 622, and emergency service providers 624 and 626. Homes 602, 604, and 606 are owned by separate families. The apartment building 610, condominium building 612, and office building 614 are owned by a group of individuals or families, each of whom may be a policyholder of the insurance company 622. In some instances, the buildings 610, 612, and 614 are managed by a centralized management company which insures the entire building, in addition to the insurance purchased by the each unit's owner. The scenario 600 also includes a sensor data collection office 620 for receiving sensor data generated by various sensors implemented on or near the premises of monitored properties. The collection office 620 may be owned by a remote monitoring service provider. Alternatively, or in addition, the collection office 620 may be co-owned by both a service provider and the insurance company 622. The emergency service providers 624 and 626 include companies, government entities (e.g., police station, fire station), hospitals, or individuals offering emergency services, such as fixing water leakage. The emergency service providers 624 and 626 may be preferred providers of the insurance company 622. These providers may have electronic equipment or notification systems connected to a computer system of insurance company 622 and/or the collection center 620 for receiving real-time notification in case a policyholder is in need of their services. Similarly, the insurance company 622 may be connected directly or indirectly to the collection center 620 for receiving and processing data received in real-time.

In the scenario 600, home 602 may be an insured property currently receiving property insurance discounts, because it is receiving remote monitoring services for detecting burglary. Similarly, the home 604 is another insured property, but is not currently receiving any remote monitoring services. The home 606 may be another insured property insured by the insurance company 622. The remote monitoring services for the home 606 may include: fire detection, carbon monoxide level detection, water leakage detection, and burglary detection. Since each home is receiving different monitoring coverage, each policyholder may be offered a different insurance policy and premium. For example, the insurance premium for the owner of the home 602 is $65/month, while the premium for the owner of the home 604 is $80/month, the full amount, and owner of the home 606 is only paying $50/month, because the home 606 has the most comprehensive monitoring coverage. For homes 602 and 606, various sensors may be installed in and around the homes and data collected using the sensors may be sent to the collection center 620 automatically. It should be noted that types of sensors used for remote monitoring are well known in the art. These sensors may detect, encode and transmit data using various electromagnetic or acoustic waves, such as, without limitation, radio waves, microwaves, infrared, ultrasonic waves, and the like. Sensors may repeatedly, intermittently, or continuously send the monitoring data to the collection center 620 over the internet or wired connections. Alternatively, the data may be sent only if an abnormality is detected.

In the scenario 600, the collection center 620 may also collect real time data about the various aspects of the insured properties so that the insurance company 622 may use such data to determine damages, in addition to verifying whether the policyholders are receiving the monitoring services. For example, the collection center may receive sensor data such as the pressure of the water in the pipe before the pipe burst, humidity surrounding the pipe, the amount of water that has leaked as a result, and/or the like. The received data may also be used by the insurance company 622 to determine which emergency service provider to contact for preventing causes of loss, mitigating a loss, or repair any resulting damage from a loss. Since the emergency service providers 626 may be connected directly to the sensor data collection center 620, the providers may be contacted in real time. Having such sensor data may also assist the emergency service provider in assessing the conditions and situation to more easily identify ways to eliminate a cause of loss or to repair damages.

In buildings such as the apartment building 610, condominium building 612, or the office building 614, sensors may be installed in each individual unit or office within the buildings. A central data collector may also be installed inside the apartment building for collecting data received from each unit or office. Centralized data collectors may be implemented on a per floor basis. There may also be servers that manage all the received data for an entire building. Such servers may also house other information used by an on-site management office for transmitting received data from each unit to the collection center 620. The server may further be connected to a database for indexing data collected for each unit currently receiving monitoring services. One or more units may use a different service provider for their monitoring services. Therefore, each unit may also be indexed to include information about the type of monitoring services as well as the name of the service provider. Finally, each sensor implemented in a unit may communicate with the collection center wirelessly or through wired connections.

The invention may be embodied in other specific forms without departing from the spirit or essential characteristics thereof. The foregoing embodiments are therefore to be considered in all respects illustrative, rather than limiting of the invention.

The invention claimed is:

1. An automated validation system for validating information used to determine insurance policy adjustments, comprising:

an application server of an insurance company configured to:

obtain from a database information about at least one current policyholder, at least one property of the at least one current policyholder being covered under a property insurance policy offered by the insurance company, wherein a portion of the information indicates that the at least one property of the at least one current policyholder is receiving remote monitoring services from a service provider, wherein the at least one property is one of a home and its associated grounds, an apartment complex, a condominium building and an office building, the remote monitoring services employing sensors for detecting one or more of fire hazards, carbon monoxide levels, water leakage, break-ins and low temperatures;

validate on a repeated basis more frequently than a term of the property insurance policy and during the term of the property insurance policy, by a trusted third party server employing a secure peer-to-peer communication protocol, that the at least one property of the at least one current policyholder is currently receiving remote monitoring services from the service provider, the trusted third party not being either the insurance company or the service provider, said validating occurring more frequently than the term of the property insurance policy, the trusted third party server further receiving policyholder data from the insurance company and customer data from the service provider and said validating being based on the received policyholder data and customer data without the trusted third party server providing policyholder data to the service provider, and wherein the service provider does not provide customer data of the service provider to the application server, the trusted third party server performing validating by comparing names of policyholders to names of customers of the service provider to identify matching names, identifying policyholder names not matching a name of any customer, approximating the names of the policyholders not matching a name of any customer to be within a predefined code distance apart from an original name of the current policyholder and comparing the approximated name with names of customers of the service provider;

store in the database validation results received from the trusted third party server, and a business logic computer in communication with the application server configured to determine an insurance policy adjustment given to the at least one current policyholder, responsive to a determination based on the validation results and the portion of the information indicating receipt of remote monitoring services that the at least one property of the at least one current policyholder is either (i) not currently receiving remote monitoring services from the service provider or (ii) currently receiving remote monitoring services from the service provider different from the remote monitoring services indicated in the portion of the information indicating receipt of remote monitoring services, and responsive to a determination based on the validation results and the portion of the information indicating receipt of remote monitoring services that the at least one property of the at least one current policyholder is currently receiving remote monitoring services from the service provider as indicated in the portion of the information indicating receipt of remote monitoring services, configured to determine that an insurance policy benefit provided to the policyholder remains unchanged.

2. The system of claim 1, wherein the insurance policy adjustment comprises one of a change in insurability of the at least one property, policy premium discount, coverage limit, deductible, and dividend.

3. The system of claim 1, wherein the validation results include information about a type of coverage of remote monitoring services the property is receiving, and wherein said business logic computer determines an adjustment to said insurance policy responsive to changes in said type of coverage of remote monitoring services provided in said validation results.

4. The system of claim 3, wherein the validation results include information about the technology used as part of the policyholder's remote monitoring services.

5. The system of claim 1 further comprising a communication interface configured to notify the at least one policyholder of the policy adjustment via at least one of mail, email, text messages, a web-based application, and telephone calls.

6. The system of claim 1, wherein a portion of the business logic computer is hosted on a same computer system as the application server.

7. The system of claim 1, further comprising a sensor data collection system configured to receive sensor data associated with the remote monitoring services, wherein the collection system is in communication with the application server.

8. The system of claim 1, wherein the application server is in communication with an emergency service provider.

9. The system of claim 1, wherein the business logic computer is configured to determine a monetary penalty for the at least one policyholder based at least in part on the validation results.

10. The system of claim 1, wherein the validation results received from the trusted third party server further comprise a date of termination of monitoring services, and the business logic computer is further configured to generate a retroactive bill for premiums due from the date of termination.

11. The system of claim 1, wherein the validation results received from the trusted third party server further comprise data indicative of an upgrade or downgrade in monitoring services, the insurance policy adjustment is a discount, and the business logic computer is further configured to change the discount responsive to the data indicative of an upgrade or downgrade in monitoring services.

12. The system of claim 1, wherein the insurance policy adjustment is a discount, the validation results received from the trusted third party server comprise data indicative of a type of monitoring service which reduces a risk of a peril, and the business logic computer is further configured to determine the discount based on a fraction of a portion of a premium for covering the peril.

13. The system of claim 1, wherein the validation results include utilization data indicative of the policyholder's use of said remote monitoring services.

14. The system of claim 13, wherein the utilization data includes data indicative of how frequently the policyholder activates the monitoring services, and wherein said business logic computer adjusts a policy premium discount based on said data indicative of how frequently the policyholder activates the monitoring services.

15. The system of claim 1, wherein the property is a home and its associated grounds.

16. The system of claim 1, wherein said business logic computer is configured to further provide an additional discount to a policyholder for keeping the policyholder's monitoring information up to date with the insurance company.

17. The system of claim 1, wherein said business logic computer is configured to further provide a discount varying based on one of a number or percentage of properties in a neighborhood, in which the at least one property is located, receiving monitoring services, wherein a property located in a neighborhood with a greater usage of remote monitoring services receives a greater discount.

18. The system of claim 1, wherein the trusted third party server further, responsive to receipt from the service provider of data reflecting an intentional cancellation, embeds data reflecting the intentional cancellation in the validation results of that policyholder provided to the application server.

19. The system of claim 18, wherein the trusted third party server further, responsive to receipt from the service provider of data reflecting termination because payment for the monitoring services was past due for a predefined amount of time, embeds data reflecting the termination because payment for the monitoring services was past due for a predefined amount of time in the validation results of that policyholder provided to the application server, and
  wherein the application server is further configured to: (a) remind the policyholders that the remote monitoring services need to be reactivated for them to continue to receive the insurance discounts, responsive to receipt in the validation results data reflecting the termination because payment for the monitoring services was past due for a predefined amount of time; and (b) withdraw a discount provided to the policyholder, responsive to receipt of data reflecting the intentional cancellation in the validation results of the policyholder.

20. A method for validating information used to determine insurance policy adjustments, comprising:
  obtaining by an application server of an insurance company from a database information about at least one current policyholder, at least one property of the at least one current policyholder covered under a property insurance policy offered by the insurance company, wherein a portion of the information indicates that at least one property of the at least one policyholder is receiving remote monitoring services from a service provider, wherein the at least one property is one of a home and its associated grounds, an apartment complex, a condominium building, and an office building, the remote monitoring services employing sensors for detecting one or more of fire hazards, carbon monoxide levels, water leakage, break-ins and low temperatures;
  validating, employing a secure peer-to-peer communication protocol, by a trusted third party server on a repeated basis more frequently than a term of the property insurance policy and during the term of the property insurance policy, that the at least one property of the at least one policyholder is currently receiving remote monitoring services from the service provider, the trusted third party not being either the insurance company or the service provider, said validating occurring more frequently than the term of the property insurance policy, the trusted third party server further receiving policyholder data from the insurance company and customer data from the service provider and said validating being based on the received policyholder data and customer data without the trusted third party providing policyholder data to the service provider, and wherein the service provider does not provide customer data of the service provider to the application server, the trusted third party server performing validating by comparing names of policyholders to names of customers of the service provider to identify matching names, identifying policyholder names not matching a name of any customer, approximating the names of the policyholders not matching a name of any customer to be within a predefined code distance apart from an original name of the current policyholder and comparing the approximated name with names of customers of the service provider;
  storing by the application server in the database validation results received from the trusted third party server; and
  responsive to a determination based on the validation results and the portion of the information indicating receipt of remote monitoring services that the at least one property of the at least one current policyholder is either (i) not currently receiving remote monitoring services from the service provider or (ii) currently receiving remote monitoring services from the service provider different from the remote monitoring services indicated in the portion of the information indicating receipt of remote monitoring services, determining by a business logic computer in communication with the application server an insurance policy adjustment given to the at least one policyholder, and responsive to a determination based on the validation results and the portion of the information indicating receipt of remote monitoring services that the at least one property of the at least one current policyholder is currently receiving remote monitoring services from the service provider as indicated in the portion of the information indicating receipt of remote monitoring services, determining by the business logic computer that an insurance policy benefit provided to the policyholder remains unchanged.

21. The method of claim 20, wherein the insurance policy adjustment comprises one of a change in insurability of the at least one property, policy premium discount, coverage limit, deductible, and dividend.

22. The method of claim 20, wherein the validation results include information about a type of coverage of remote monitoring services the property is receiving, and wherein an adjustment to said insurance policy is made in response to changes in said type of coverage of remote monitoring services provided in said validation results.

23. The method of claim 20, further comprising notifying, by a communication interface, the at least one policyholder of the policy adjustment via at least one of mail, email, text messages, a web-based application, and telephone calls.

24. The method of claim 20, further comprising hosting a portion of the business logic computer on a same computer system as the application server.

25. The method of claim 20, further comprising receiving by a sensor data collection system sensor data associated with the remote monitoring services, wherein the collection system is in communication with the application server.

26. The method of claim 20, further comprising establishing communication between the application server and an emergency service provider.

27. The method of claim 20, further comprising determining by the business logic computer a monetary penalty for the at least one policyholder based at least in part on the validation results.

28. A computerized system for validation, comprising:
an application server of an insurance company configured to:
obtain from a database information about at least one current policyholder, at least one property of the at least one current policyholder being covered under a property insurance policy offered by the insurance company, wherein a portion of the information indicates that the at least one property of the at least one current policyholder is receiving remote monitoring services from a service provider, wherein the at least one property is one of a home and its associated grounds, an apartment complex, a condominium building and an office building, the remote monitoring services employing sensors for detecting one or more of fire hazards, carbon monoxide levels, water leakage, break-ins and low temperatures;
permit the at least one current policyholder to establish an online account with the insurance company;
permit the at least one current policyholder to login to the online insurance company account;
while the at least one current policyholder is simultaneously logged in to the online insurance company account and to an account with a computer system of the service provider, receive, by the application server, a token from the service provider system, the token indicative that the at least one current policyholder is an active customer of the service provider;
establish a communication session between the application server and the service provider system and receive from the service provider system additional information indicative of services provided to the at least one current policyholder by the service provider; and
store in the database validation results indicative of whether the at least one property of the at least one current policyholder is currently receiving remote monitoring services from the service provider, received from the at least one current policyholder account, and
a business logic computer in communication with the application server configured to determine an insurance policy adjustment given to the at least one current policyholder, responsive to a determination based on the validation results and the portion of the information indicating receipt of remote monitoring services, that the at least one property of the at least one current policyholder is either (i) not currently receiving remote monitoring services from the service provider or (ii) currently receiving remote monitoring services from the service provider different from the remote monitoring services indicated in the portion of the information indicating receipt of remote monitoring services, and responsive to a determination based on the validation results and the portion of the information indicating receipt of remote monitoring services that the at least one property of the at least one current policyholder is currently receiving remote monitoring services from the service provider as indicated in the portion of the information indicating receipt of remote monitoring services, configured to determine that an insurance policy benefit provided to the policyholder remains unchanged.

29. The system of claim 28, wherein the communication session employs a protocol that enables a third-party application to obtain limited access to an HTTP service.

30. The system of claim 28, wherein the business logic computer is further configured to, responsive to determination of an insurance policy adjustment, generate an electronic message to the policyholder having data indicative of the insurance policy adjustment.

* * * * *